(12) United States Patent
Kleinschmidt et al.

(10) Patent No.: US 10,816,036 B2
(45) Date of Patent: Oct. 27, 2020

(54) BEARING BUSHING WITH RADIAL DEPRESSIONS AND PLATEAU SURFACES

(71) Applicant: Bosch Mahle Turbo Systems GmbH & Co. KG, Stuttgart (DE)

(72) Inventors: Ruediger Kleinschmidt, Besigheim (DE); Oliver Kuhne, Stuttgart (DE); Steffen Schmitt, Ditzingen (DE); Frieder Stetter, Stuttgart (DE)

(73) Assignee: BMTS Technology GmbH & Co. KG (DE)

( * ) Notice: Subject to any disclaimer, the term of this patent is extended or adjusted under 35 U.S.C. 154(b) by 109 days.

(21) Appl. No.: 15/830,822

(22) Filed: Dec. 4, 2017

(65) Prior Publication Data

US 2018/0156273 A1    Jun. 7, 2018

(30) Foreign Application Priority Data

Dec. 5, 2016    (DE) .................. 10 2016 224 094

(51) Int. Cl.
*F16C 33/10*    (2006.01)
*F04D 25/02*    (2006.01)
(Continued)

(52) U.S. Cl.
CPC .......... *F16C 33/1065* (2013.01); *F04D 17/10* (2013.01); *F04D 25/024* (2013.01);
(Continued)

(58) Field of Classification Search
CPC ............... F16C 2360/24; F16C 33/101; F16C 33/1015; F16C 33/1065; F16C 33/107;
(Continued)

(56) References Cited

U.S. PATENT DOCUMENTS 3,433,542 A * 3/1969 Okano ................ F16C 33/1075
384/287
4,427,309 A † 1/1984 Blake
(Continued)

FOREIGN PATENT DOCUMENTS

CN        1626840 A  *  6/2005
CN    200971919 Y  * 11/2007
(Continued)

OTHER PUBLICATIONS

English abstract for JP-H01-193409.
(Continued)

*Primary Examiner* — Laert Dounis
(74) *Attorney, Agent, or Firm* — Fishman Stewart PLLC

(57) ABSTRACT

A bearing bushing for a charging device may include an inner jacket surface including at least two radial depressions. A respective lowest point of the at least two radial depressions may be disposed on a circle having a radius R1. A plurality of plateau surfaces may be disposed circumferentially between the at least two radial depressions and may be offset radially towards an inside of the bearing bushing. The plateau surfaces may be curved and may have a constant radius R2. A ratio between the radius R1 and the radius R2 may correspond to the relationship: R1/R2=1.001 to 1.015.

12 Claims, 1 Drawing Sheet

(51) Int. Cl.
*F04D 17/10* (2006.01)
*F04D 29/056* (2006.01)

(52) U.S. Cl.
CPC ........ *F04D 29/056* (2013.01); *F16C 33/1075* (2013.01); *F16C 33/1085* (2013.01); *F16C 2240/40* (2013.01); *F16C 2240/70* (2013.01); *F16C 2360/23* (2013.01); *F16C 2360/24* (2013.01)

(58) Field of Classification Search
CPC .............. F16C 33/1075; F16C 32/0659; F02B 37/00–24; Y02T 10/144
See application file for complete search history.

(56) References Cited

U.S. PATENT DOCUMENTS

| | | | |
|---|---|---|---|
| 5,480,234 A | | 1/1996 | Chen et al. |
| 5,628,567 A | * | 5/1997 | Murabe ............... F16C 33/1075 384/100 |
| 2001/0017952 A1 | * | 8/2001 | Orndorff, Jr. ........ B63H 23/321 384/91 |
| 2006/0078239 A1 | * | 4/2006 | Dimofte .............. F16C 32/0685 384/100 |
| 2015/0337894 A1 | * | 11/2015 | Yoshino ................ F16C 17/024 384/103 |
| 2017/0009810 A1 | † | 1/2017 | Futae |
| 2018/0114669 A1 | * | 4/2018 | Sporbeck .............. H01J 35/101 |

FOREIGN PATENT DOCUMENTS

| | | | | |
|---|---|---|---|---|
| CN | 102192238B | B | † | 1/2013 |
| DE | 102015213504 | A1 | * | 1/2017 .............. F16C 17/02 |
| EP | 2693017 | A1 | | 2/2014 |
| JP | H01-193409 | A | | 8/1989 |
| WO | WO2015128978 | A1 | † | 9/2015 |

OTHER PUBLICATIONS

Design of Journal Bearings for Rotating Machinery, Allaire et al, in Proceedings of the 10th Turbomachinery Symposium, pp. 25-46, 1981. The table of contents for the Proceedings of the 10th Turbomachinery Symposium are viewable on the internet at: https://oaktrust.library.tamu.edu/handle/1969.1/163722. Allaire itself is available on the internet at: https://oaktrust.library.tamu.edu/handle/1969.1/163716.†

No Conventional Fluid Films Bearings with Waved Surface, Dimofte et al, in New Tribological Ways, pp. 336-358, Apr. 26, 2011. Published on Apr. 26,2011. This publication is available on the internet at: https://www.intechopen.com/books/new-tribological-ways/no-conventional-fluid-film-bearings-with-waved-surface.†

Rotordynamic Characteristics of Large Locomotive Turbochargers, Chen W.J., Proceedings of the 8th IFToMM International Conference on Rotordynamics 2010,2012, Curran Associates, USA, ISBN 9781618393470. Published no later than Apr. 2012 (see http://www.proceedings.com/13589.html).†

* cited by examiner
† cited by third party

BEARING BUSHING WITH RADIAL DEPRESSIONS AND PLATEAU SURFACES

CROSS-REFERENCE TO RELATED APPLICATION

This application claims priority to German Application DE 10 2016 224 094.3 filed on Dec. 5, 2016, the contents of which is hereby incorporated in its entirety.

TECHNICAL FIELD

The invention at hand relates to a bearing bushing for a charging device, in particular for an exhaust gas turbocharger. Moreover, the invention relates to a charging device comprising such a bearing bushing as well as to an internal combustion engine comprising such a charging device.

BACKGROUND

For the subcritical and supercritical range of a rotor, which is necessary in the case of charging devices, a corresponding support thereof is required, whereby, in addition to a sufficient load-bearing capacity and stability of the bearings, it is simultaneously also desirable to reduce a subsynchronous movement of the shaft of the rotor relative to the bearing. In particular an undesirable vibration behavior of the rotor can be reduced through this and an improved acoustic behavior of the charging device can be attained. It goes without saying that further goals are the reduction of the friction losses in the bearings, in order to be able to improve the efficiency as well as a transient behavior of the charging device.

Multi-surface radial plain bearings are known from the plain bearing technology for subcritically rotating shafts comprising upright bearing bushings, that is, for shafts, the speed of which lies below the natural frequency of the shaft, for example from EP 2 693 017 A1 and from JP 01193409 A.

As described in the previous paragraph, however, the multi-surface radial plain bearings known from the prior art typically only reduce a noise development in the subcritical range. In the supercritical range, in contrast, there is no improvement. In addition, said radial plain bearings can only be produced in a comparatively extensive and thus expensive manner. The invention at hand thus deals with the problem of specifying an improved or at least an alternative embodiment for a bearing bushing of the generic type, which is characterized in particular by a reduction of a noise emission in the subcritical as well as in the supercritical range, and which can in particular be produced easily.

According to the invention, this problem is solved by means of the subject matter of the independent claim(s). Advantageous embodiments are the subject matter of the dependent claims.

SUMMARY

The invention at hand is based on the general idea of equipping an inner jacket surface of a bearing bushing with depressions in such a way that friction losses on the one hand as well as noise emissions on the other hand can be reduced and a bearing stability can nonetheless be maintained. On an inner jacket surface, the bearing bushing according to the invention thereby has at least two radial depressions, the respective lowest point of which is located on a circle with radius R1. Provision is made circumferentially between the depressions for plateau surfaces, which are offset radially to the inside and which are curved, and which have a constant radius R2, whereby the following ratio between R1 and R2 applies:

$$1.001 \leq R1/R2 \leq 1.015.$$

By means of an inner jacket surface of the bearing bushing, which is embodied in this manner, it is possible to reduce the noise emission in the subcritical range, that is, at a speed of below the natural frequency of the shaft as well as in the supercritical range, that is at a speed above the natural frequency of the shaft, without negatively influencing the bearing stability thereby. Compared to a previously known circular cylindrical bearing, the friction losses also improve significantly, whereby a further improvement of the friction losses is possible based on the improved stability characteristics by reducing the bearing surface, that is, in particular also by means of a smaller bearing bushing. The depressions according to the invention can thereby be created by means of non-circular processing with geometrically defined cutting edge, for example directly in a turning process or via a corresponding actuator, which provides for a lifting movement at the geometrically defined cutting edge in sync with the processing speed. In response to the processing, the positioning of an oil inlet hole or generally of an oil hole, respectively, to the internal geometrical shape can be considered. The processing via a rolling tool, which has the geometrical shape stamped on the spindle, which guides the rollers, is a further option for the production of the depressions according to the invention. The lifting movement for creating the geometry is created via the geometrical shape of the spindle. As an alternative to this, the geometry can also be created by means of countersinking. The curved plateau surfaces can thereby also be produced particularly easily and thus cost-efficiently. The constant sound behavior can also be improved significantly. Ramps, which serve for the pressure build-up for oil for lubricating a rotor supported by the bearing bushing according to the invention, are furthermore formed by means of the depressions according to the invention. Due to the non-gradual, but rounded transition between the depressions and the plateau surfaces, which take over the actual support of the rotor or of a shaft, respectively, a pressure build-up in the oil can be attained, which would not be possible with a gradual transition. Significant advantages for the support result through this.

In the case of an advantageous further development of the solution according to the invention, all depressions, in particular two, three, five, or six depressions, are embodied so as to be rounded and identical. The bearing stability as well as the noise development can be influenced individually through this.

In the case of an advantageous further development of the solution according to the invention, provision is made for a total of three depressions, wherein the bearing bushing has a number of oil holes, which corresponds to the number of the depressions, in each case comprising a radial axis, which in each case end in the lowest point of the depressions. The rounded depressions thereby have a radius R3 comprising a center point, which is shifted outwards by an eccentricity E=R1−R3 on the respective radial axis of the corresponding oil hole. A particularly high bearing stability with a simultaneously reduced noise emission can be attained by means of such a design of the inner jacket surface of the bearing bushing according to the invention.

In the case of an advantageous further development of the solution according to the invention, a ratio of a width B of the bearing bushing to a diameter thereof B/D=0.4 to 1.0.

This comparatively large range already gives the idea that the bearing geometry according to the invention provides for small as well as for larger bearing bushings. In particular, a plurality of narrow bearing bushings can also be arranged next to one another to support the shaft of the rotor of the charging device. The advantage of the ratio is a ratio between bearing stability and friction, which is optimal for this application.

In the case of an advantageous further development of the solution according to the invention, provision is made for a total of three curved plateau surfaces, which are arranged on the circumference so as to be offset by 120°, wherein the three curved plateau surfaces in each case occupy an angular range $\alpha$ of between 5°<$\alpha$<60°. The plateau surfaces thus cover a total angular range of between approx. 4 and 50% of the inner jacket surface.

The invention at hand is further based on the general idea of supporting a shaft of a charging device, which can be embodied for example as exhaust gas turbocharger, in a motor vehicle, via at least one such bearing bushing, in particular in a bearing housing. The bearing bushing can thereby be embodied so as to be stationary or so as to rotate. The charging device according to the invention is thus able to realize the invention idea in the case of rotating as well as in the case of stationary bearing bushings, i.e. in the case of bearing bushings, which are arranged in a rotatably fixed manner.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the invention at hand.

Preferred exemplary embodiments of the invention are illustrated in the drawings and will be described in more detail in the description below, whereby identical reference numerals refer to identical or similar or functionally identical components.

DETAILED DESCRIPTION

Figure 1:
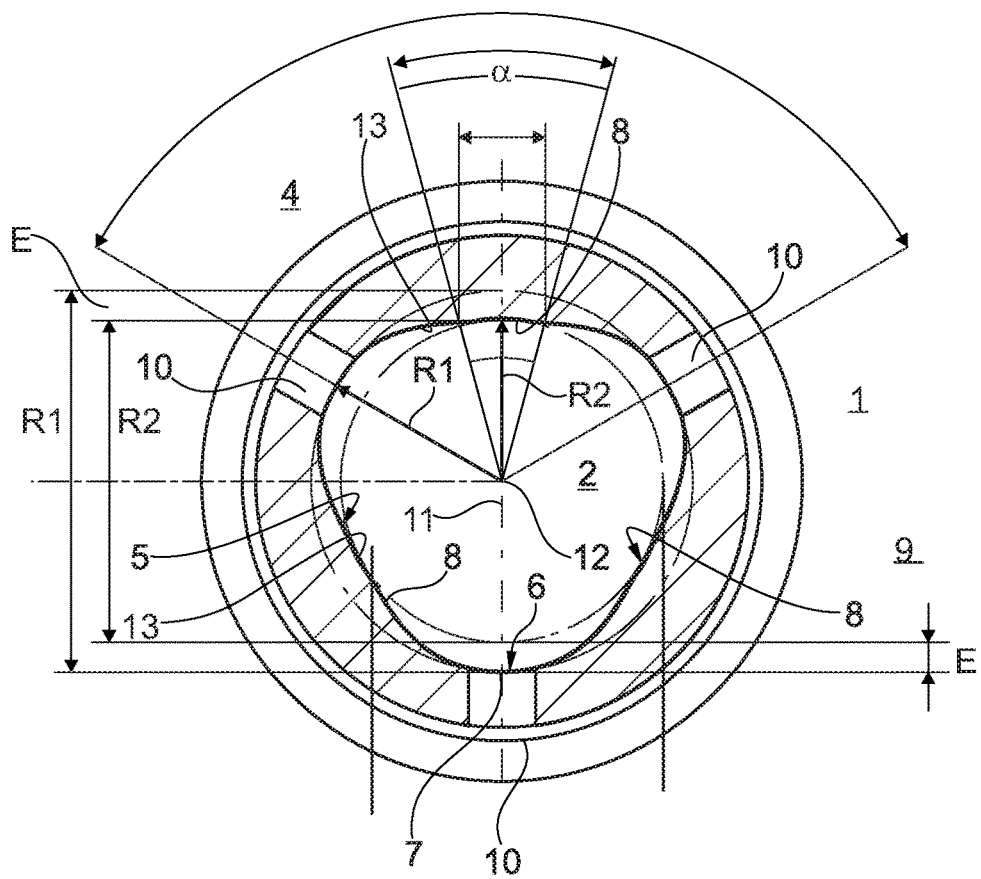
FIG. 1 shows a sectional illustration through a charging device according to the invention in the area of a shaft of a rotor of the charging device, which is supported via a bearing bushing.

According to FIG. 1, a charging device 1 according to the invention, which can be embodied for example as exhaust gas turbocharger in a motor vehicle, has a rotor having a shaft 2, wherein the shaft 2 is supported via at least one bearing bushing 3, in particular in a bearing housing 4. To now be able to reduce a noise emission in response to the operation of the charging device 1 by means of the rotating rotor, as well as a friction, an inner jacket surface 5 of the bearing bushing 3 has at least two, in the shown example a total of three, depressions 6. The respectively lowest point 7 of the depressions 6 is thereby located on a circle with radius R1. Provision is made circumferentially between the individual depressions 6 for plateau surfaces 8, which are offset radially to the inside and which are curved and which have a constant radius R2. According to the invention, the following ratio applies between the radius R1 and the radius R2 applies according to the invention: R1/R2≤1.001 to 1.015. The ratio is thereby in particular a function of the diameter (approximately R2) of the shaft 2.

When further looking at FIG. 1, it can be seen that all depressions 6 are embodied so as to be rounded and identical. All depressions 6 are furthermore arranged so as to be distributed evenly across the circumference, whereby, in the case of three depressions 6, this means an arrangement of the depressions 6 so as to be offset by 120° each.

The bearing bushing 3 furthermore has a number of oil holes 10, in particular of oil inlet holes 10, which corresponds to the number of the depressions 6, in each case comprising a radial axis 11, which ideally end in the lowest point 7 of the depressions 6. The rounded depressions 6 thereby have the radius R3 (loop radius) comprising a center point M1, which is shifted outwards by an eccentricity E=R1−R3 on the respective radial axis 11 of the corresponding oil hole 10. The loop radius R3, that is, the radius R3 of the depressions 6, is thereby smaller than R2.

Provision can further be made for the depression 6 to have a maximum depth R1 with regard to a center axis 12 (i.e. the depression does not have a constant radius with regard to the center axis). For example, the dimensions of the depression 6 can thereby be in the following ranges:

2.5 mm<$R1$<4.0 mm, 0.03 mm<$E$<0.04 mm,

20°<$\alpha$<35°.

In particular the combination of the plateau surfaces 8 is hereby advantageous to improve the load-bearing capacity with the depressions 6 in the form of ramps for pressure build-up.

Some possible combinations of the dimensions are listed in the table below

|  | plateau angle alpha [°] | R1 [mm] sleeve diameter | R2 [mm] inner Ø | eccentricity | depth | Loop diameter |
|---|---|---|---|---|---|---|
| BM42 | 30 | R2.11 (Ø4.22) | R2.1 (Ø4.2) | 0.034 | 0.01 | R2.077 (Ø4.153) |
| BM52 | 30 | R2.61 (Ø5.22) | R2.6 (Ø5.2) | 0.034 | 0.01 | R2.576 (Ø5.152) |
| BM60 | 25 | R3.01 (Ø6.02) | R3 (Ø6) | 0.031 | 0.01 | R2.979 (Ø5.959) |
| BM65 | 25 | R3.26 (Ø6.52) | R3.25 (Ø6.5) | 0.031 | 0.01 | R3.229 (Ø6.459) |
| BM70 | 25 | R3.5125 (Ø7.025) | R3.5 (Ø7) | 0.038 | 0.0125 | R3.474 (Ø6.949) |
| BM79 | 25 | R3.9625 (Ø7.925) | R3.95 (Ø7.9) | 0.038 | 0.0125 | R3.924 (Ø7.849) |
| BM89 | 25 | R4.463 (Ø8.925) | R4.45 (Ø8.9) | 0.038 | 0.0125 | R4.424 (Ø8.848) | where:

R1 is a radius from the center axis 12 to the lowest point 7 of a depression 6, sleeve radius, R2 is a radius of the curved plateau surfaces 8, inner diameter, R3 is a loop radius of the depressions 6, E: is the eccentricity, α: is the plateau angle.

It is particularly advantageous hereby that the depressions 6 transition continuously into adjacent plateau surfaces 8 and vice versa. Due to the depressions 6 according to the invention, ramps 13 are formed thereby, which serve to build up a pressure for oil for lubricating a rotor supported by the bearing bushing 1 according to the invention. Due to the continuous transition between the depressions 6 and the plateau surfaces 8, a pressure build-up in the oil can be attained, which would not be possible with a gradual transition. This results in significant advantages for the storage.

Provision is thereby preferably made for a total of three curved plateau surfaces 8, which are arranged on the circumference so as to be offset by 120°, and which in each case occupy an angular range α of between 5°<α<60° (plateau angle).

Figure 2:
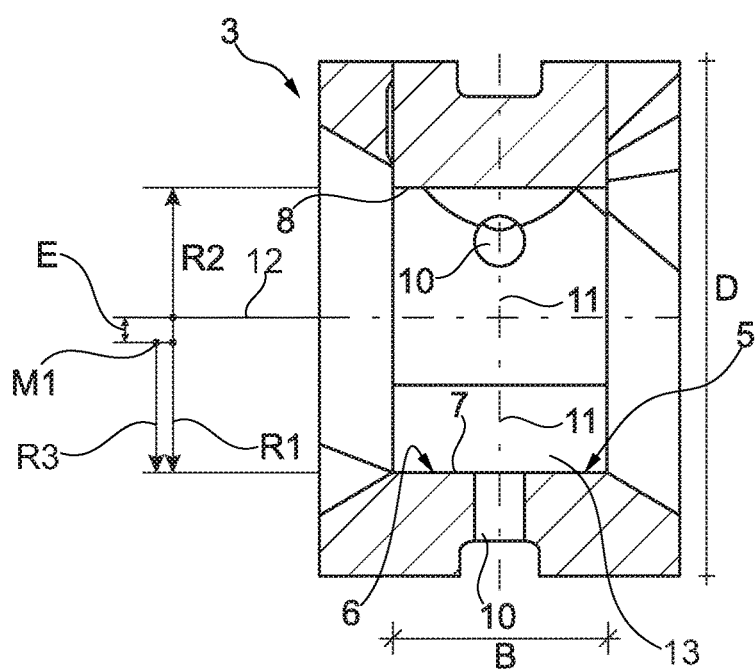
FIG. 2 shows a longitudinal section through the bearing bushing according to the invention.

A ratio of a width B of the bearing bushing 3 to a diameter D thereof is preferably B/D=0.4 to 1.0 (see FIG. 2). This ratio is in particular a function of the desired bearing stability.

The bearing bushing 3 itself can be arranged in the bearing housing 4 in a stationary or rotating manner, so that the invention can be realized in the case of a stationary as well as in the case of a rotating bearing bushing 3.

The acoustics of the charging device 1 can be improved by means of the charging device 1 according to the invention and the bearing bushing 3, which is also in accordance with the invention, by simultaneously maintaining the bearing stability. In the case of a comparable geometry, that is, in the case of the same bearing width, the same bearing diameter and the same bearing play, the performance losses as compared to known circular cylindrical bearings are already improved significantly. Due to the improved stability characteristics, a further improvement of the friction losses is furthermore possible by decreasing the bearing surface (bearing width, bearing diameter). The friction losses can thus be reduced by means of the bearing according to the invention and in particular by means of the bearing bushing 3 according to the invention, and the efficiency as well as the transient behavior of the charging device 1 can thus be increased. The charging device 1 according to the invention can be used for example in an internal combustion engine 9, in particular in a motor vehicle.

It goes without saying that the invention is to also protect the bearing bushing 3, the inner jacket surface 5 of which has at least two radial depressions 6. The respective lowest point 7 of the depressions 6 is thereby located on a circle with radius R1, whereby provision is made circumferentially between the depressions 6 for plateau surfaces 8, which are offset radially to the inside and which are curved and which have a constant radius R2. The following ratio between R1 and R2 applies thereby: 1.001≤R1/R2≤1.015.

All depressions 6 can thereby be embodied so as to be rounded and identical. The bearing bushing 3 has a number of oil holes 10, which corresponds to the number of the depressions 6, in each case comprising a radial axis 11, each of which ends in the lowest point 7 of the depressions 6. The rounded depressions 6 thereby have a radius R3 (loop radius) comprising a center point M1, which is shifted outwards by an eccentricity E=R1−R3 on the respective radial axis 11 of the corresponding oil hole 10. A ratio of a width B of the inner bearing surface of the bearing busing 3 to a diameter D of the latter is thereby preferably: 0.4≤B/D≤1.0.

The invention claimed is:

1. A bearing bushing, comprising:
   an inner jacket surface including at least two radial depressions, the at least two radial depressions having a respective lowest point disposed on a circle defining a first radius R1 from a center axis;
   a plurality of plateau surfaces disposed circumferentially between the at least two radial depressions, the plurality of plateau surfaces arranged offset radially to an inside and define a curved structure having a second radius R2 from the center axis, wherein the second radius R2 is constant and concentric to the first radius R1;
   at least two oil holes corresponding to the at least two radial depressions, the at least two oil holes respectively having a radial axis running through the respective lowest point of the at least two radial depressions;
   wherein a ratio between the first radius R1 and the second radius R2 corresponds to the following relationship: R1/R2=1.001 to 1.015;
   wherein the at least two radial depressions are rounded and define a third radius R3 having a center point shifted outwards from the center axis by an eccentricity E=R1−R3 on the radial axis of a corresponding one of the at least two oil holes,
   wherein the third radius R3 is smaller than the second radius R2; and
   wherein the at least two radial depressions define respective ramps disposed circumferentially between the corresponding oil hole and an adjacent plateau surface of the plurality of plateau surfaces, and wherein the respective ramps are rounded and provide a non-gradual and continuous transition defined by the third radius R3 that extends from the corresponding oil hole at the first radius R1 to the adjacent plateau surface at the second radius R2.

2. The bearing bushing according to claim 1, wherein the at least two radial depressions are at least one of structured to be identical to one another and distributed evenly across a circumference of the inner jacket surface.

3. The bearing bushing according to claim 1, wherein the at least two radial depressions include three depressions arranged on a circumference of the inner jacket surface and are offset from one another by 120°.

4. The bearing bushing according to claim 1, wherein a ratio of a bearing bushing width B to a bearing bushing diameter D corresponds to the following relationship: B/D=0.4 to 1.0.

5. The bearing bushing according to claim 1, wherein:
   the plurality of plateau surfaces includes three plateau surfaces arranged on a circumference of the inner jacket surface offset from one another by 120°; and
   the three plateau surfaces each occupy an angular range α of between 5°<α<60°.

6. The bearing bushing according to claim 1, wherein at least one of the at least two radial depressions and the plurality of plateau surfaces arranged circumferentially therebetween have at least one of the following dimensions:

2.5 mm<$R$1<4.0 mm, 0.03 mm<$E$<0.04 mm, and

20°<α<35°;

wherein R1 is the first radius R1, E is an eccentricity from which the at least two radial depressions are shifted radially outwards, and α is an angular range.

7. The bearing bushing according to claim 1, wherein the plurality of plateau surfaces respectively encompass an angular range α of 20°<α<35° along a circumference of the inner jacket surface.

8. The bearing bushing according to claim 1, wherein the plurality of plateau surfaces cover a total angular range of between 4% and 50% of the inner jacket surface.

9. A charging device comprising: a rotor including a shaft supported via at least one bearing bushing, the at least one bearing bushing having a center axis and including:
   an inner jacket surface;
   at least two rounded radial depressions provided on a circumference of the inner jacket surface, the at least two rounded radial depression having a respective lowest point disposed on a circle defining a first radius R1 from the center axis;
   a plurality of oil holes corresponding in number to that of the at least two rounded radial depressions;
   a plurality of curved plateau surfaces disposed circumferentially between the at least two rounded radial depressions with respect to the center axis, the plurality of curved plateau surfaces arranged offset radially to an inside and defining a constant second radius R2 from the center axis, wherein the constant second radius R2 is concentric to the first radius R1;
   wherein a ratio between the first radius R1 and the constant second radius R2 corresponds to the following relationship: R1/R2=1.001 to 1.015;
   wherein the plurality of curved plateau surfaces each occupy an angular range α of between 20°<α<35° along a circumference of the inner jacket surface;
   wherein the plurality of oil holes each have a radial axis disposed at the respective lowest point of a corresponding one of the at least two rounded radial depressions, the at least two rounded radial depressions defining a third radius R3 having a center point shifted radially outwards from the center axis by an eccentricity E=R1−R3 on the radial axis of the plurality of oil holes;
   wherein the third radius R3 is smaller than the second radius R2; and
   wherein the at least two rounded radial depressions define respective ramps providing a non-gradual and continuous transition defined by the third radius R3 that extends from a corresponding one of the plurality of oil holes at the first radius R1 to an adjacent curved plateau surface of the plurality of curved plateau surfaces at the constant second radius R2.

10. The charging device according to claim 9, wherein the at least one bearing bushing defines a width B and a diameter D, and wherein a ratio of the width B to the diameter D corresponds to the following relationship: B/D=0.4 to 1.0.

11. A bearing bushing, comprising:
   an inner jacket surface including at least two radial depressions, the at least two radial depressions having a respective lowest point disposed on a circle defined by a first radius R1 from a center axis;
   a plurality of curved plateau surfaces disposed circumferentially between the at least two radial depressions on the inner jacket surface, the plurality of curved plateau surfaces arranged offset radially towards the center axis and defined by a constant second radius R2 from the center axis, wherein the constant second radius R2 is concentric to the first radius R1;
   wherein a ratio between the first radius R1 and the constant second radius R2 corresponds to the following relationship: R1/R2=1.001 to 1.015;
   wherein the at least two radial depressions each include a corresponding oil hole having a radial axis running through the respective lowest point thereof, and wherein the at least two radial depressions define a third radius R3 having a center point shifted outwards from the center axis by an eccentricity E=R1−R3 on the radial axis of the corresponding oil hole;
   wherein the third radius R3 is smaller than the constant second radius R2; and
   wherein the at least two radial depressions are each rounded with a non-gradual and continuous ramp defined by the third radius R3 extending between the first radius R1 and the constant second radius R2.

12. The bearing bushing according to claim 11, wherein the plurality of curved plateau surfaces each occupy an angular range α of between 20°<α<35° along a circumference of the inner jacket surface.

* * * * *